(12) United States Patent
Krupke et al.

(10) Patent No.: US 7,161,107 B2
(45) Date of Patent: Jan. 9, 2007

(54) METHOD, ARRANGEMENT AND USE OF AN ARRANGEMENT FOR SEPARATING METALLIC CARBON NANOTUBES FROM SEMI-CONDUCTING CARBON NANOTUBES

(75) Inventors: Ralph Krupke, Stutensee (DE); Frank Hennrich, Karlsruhe (DE)

(73) Assignee: Forschungszentrum Karlsruhe GmbH, Karlsruhe (DE)

( * ) Notice: Subject to any disclaimer, the term of this patent is extended or adjusted under 35 U.S.C. 154(b) by 113 days.

(21) Appl. No.: 10/815,977

(22) Filed: Apr. 2, 2004

(65) Prior Publication Data

US 2006/0266675 A1    Nov. 30, 2006

(30) Foreign Application Priority Data

Apr. 8, 2003    (DE)    ................ 103 15 897

(51) Int. Cl.
*B03C 7/00*    (2006.01)
(52) U.S. Cl. .............. 209/127.1; 209/18; 204/547
(58) Field of Classification Search .......... 209/12.2, 209/18, 127.1, 128–131, 155; 977/DIG. 1, 977/845; 204/643
See application file for complete search history.

(56) References Cited

U.S. PATENT DOCUMENTS

| 6,875,329 B1 * | 4/2005 | Washizu et al. ............ 204/547 |
| 2003/0048619 A1 | 3/2003 | Kaler et al. |
| 2004/0211669 A1 * | 10/2004 | Cummings et al. ......... 204/547 |
| 2005/0126913 A1 * | 6/2005 | Burke et al. ................ 204/547 |
| 2005/0255031 A1 * | 11/2005 | Jung et al. ................ 423/447.1 |

FOREIGN PATENT DOCUMENTS

WO    WO 03/084869    10/2003

OTHER PUBLICATIONS

Kim et al., Comparison of Single-Walled Carbon Nanotubes Transistors Fabricated by Dielectrophoresis and CVD Growth, Proceedings of 2005 5th IEEE Conference on Nanotechnology, Jul 2005.*
Burke, P.J., Nanodielectrophoresis: Electronic Tweezers, Encyclopedia of Nanoscience and Nanotechnology vol. X, p. 1-19, 2003.*
N. G. Green et al., "Dielectrophoretic separation of nano-particles," J. Phys. D: Appl. Phys.30, 1997, pp. L41-L44.
Lorin X. Benedict et al., "Static polarizabilities of single-wall carbon nanoubes," Physical Review B, Sep. 15, 1995, pp. 8541-8549, vol. 52, No. 11.
R. Krupke et al., "Contacting single bundles of carbon nanotubes with alternating electric fields," Applied Physics A, Mar. 2003, pp. 397-400.

(Continued)

*Primary Examiner*—Joseph Rodriguez
(74) *Attorney, Agent, or Firm*—Venable LLP; Robert Kinberg; Henry J. Daley

(57) ABSTRACT

A method for separating metallic carbon nanotubes and semi-conducting carbon nanotubes includes providing a suspension containing a plurality of individual metallic carbon nanotubes and semi-conducting carbon nanotubes in a liquid, for which the dielectric constant $\epsilon_L$ meets the requirement: $\epsilon_M > \epsilon_L > \epsilon_H$, wherein $\epsilon_M$ is the dieletric constant of the metallic carbon nanotubes and $\epsilon_H$ is the dielectric constant of the semi-conducting carbon nanotubes. A a non-homogeneous electric alternating field is applied to the suspension to create spatially separate species of the metallic carbon nanotubes and the semi-conducting carbon nanotubes. At least one of the separate species is then removed.

9 Claims, 3 Drawing Sheets

OTHER PUBLICATIONS

X. Q. Chen et al., "Aligning single-wall nanotubes with alternating-current electric field," Applied Physics Letters, Jun. 4, 2001, pp. 3714-3716, vol. 78, No. 23.

N. G. Green et al., "Separation of submicrometre particles using a combination of dielectrophoretic and electrohyfrodynamic forces," J. Phys. D: Appl. Phys. 31, 1998, pp. L25-L30.

Masao Washizu et al., "Molecular Dielectrophoresis of Biopolmers," IEEE Transactions in Industry Applications, Jul./Aug. 1994, pp. 835-843, vol. 30, No. 4.

Michael J. 'Connell et al., "Band Gap Fluorescence from Individual Single-Walled Carbon Nanotubes," Science, Jul. 26, 2002, pp. 593-596, vol. 297.

Lasse Jensen et al., "Static and Frequency-dependent Polarizability Tensors for Carbon Nanotubes," J. Phys. Chem. B., 2000, pp. 10462-10466, vol. 104, No. 45.

Jack Kongsted et al., "Frequency-Dependent Polarizability of Boron Nitride Nanotubes: A Theoretical Study," J. Phys. Chem. B., 2001, pp. 10243-10248, vol. 105, No. 42.

M. Machon, et al., "Ab initio calculations of the optical properties of 4-Å-diameter single-walled nanotubes," Physical Review B. 66, pp. 155410-1-155410-5.

Ralph Krupke et al., "Separation of Metallic from Semiconducting Single-Walled Carbon Nanotubes," Science, Jul. 18, 2003, pp. 344-347, vol. 301.

R. F. Service: "Sorting technique may boost nanotube research," Science 300, 2003, pp. 2018.

P. Umek et al., "Separation of SWNTs by diffusion," Synthetic Metals, Elsevier Sequoia, Lausanne, CH, Bd. 121, 2001, pp. 1211-1212.

* cited by examiner

METHOD, ARRANGEMENT AND USE OF AN ARRANGEMENT FOR SEPARATING METALLIC CARBON NANOTUBES FROM SEMI-CONDUCTING CARBON NANOTUBES

CROSS-REFERENCE TO RELATED APPLICATION

This application claims the priority of German Patent Application No. 10315897.9, filed on Apr. 8, 2003, the subject matter of which is incorporated herein by reference.

BACKGROUND OF THE INVENTION

The invention relates to a method, an arrangement and the use of an arrangement for separating metallic carbon nanotubes from semi-conducting carbon nanotubes.

Macro-molecules in which carbon atoms form the outside wall of a tube are called carbon nanotubes. For the prototype, a single-wall carbon nanotube is described with the aid of a planar ribbon of hexagonally arranged carbon atoms, which is rolled up seamlessly to form a tube. Several concentric tubes, arranged one inside the other, are referred to as multi-wall carbon nanotubes.

Typical single-wall carbon nanotubes have a diameter of 0.5 nm to 10 nm while multi-wall carbon nanotubes have a correspondingly larger diameter. Typical carbon nanotubes ranges in length from 100 nm to a few 10 micrometers, wherein the carbon nanotubes can be cut into smaller sections as well as extended by fitting them together for some methods.

Carbon nanotubes are divided into two categories because of their electronic characteristics: metallic carbon nanotubes and semi-conducting carbon nanotubes. Metallic carbon nanotubes are suitable for use as molecular wires with extremely high current-carrying capacity which are resistant to electro-migration. Semi-conducting carbon nanotubes are particularly suitable as molecular transistors. Both types represent promising components for nano-electronic circuits because of their nanoscale dimensions.

It is absolutely necessary for the production of nanoscale circuits from carbon nanotubes that metallic and semi-conducting carbon nanotubes can be manipulated separately, thus requiring metallic carbon nanotubes or semi-conducting carbon nanotubes to be produced as type-specific as possible and/or to separate these.

SUMMARY OF THE INVENTION

Starting with this premise, it is the object of the present invention to provide a method, an arrangement and the use of an arrangement for separating metallic carbon nanotubes from semi-conducting carbon nanotubes.

The above and other objects are accomplished according to the invention by the provision of a method for separating metallic carbon nanotubes and semi-conducting carbon nanotubes, which according to an exemplary embodiment comprises: providing a suspension containing a plurality of individual metallic carbon nanotubes and semi-conducting carbon nanotubes in a liquid, for which the dielectric constant $\epsilon_L$ meets the requirement: $\epsilon_M > \epsilon_L > \epsilon_H$, wherein $\epsilon_M$ is the dieletric constant of the metallic carbon nanotubes and $\epsilon_H$ is the dielectric constant of the semi-conducting carbon nanotubes; applying a non-homogeneous electric alternating field to the suspension to create spatially separate species of the metallic carbon nanotubes and the semi-conducting carbon nanotubes; and removing at least one of the separate species.

With the method according to the invention, metallic carbon nanotubes and semi-conducting carbon nanotubes, which are both present in a liquid as suspension, can be separated from each other in such a way that they can respectively be processed further.

The method according to the invention is based on the fact that carbon nanotubes are initially placed into a liquid in such a way that they do not adhere to each other. If the carbon nanotubes are not present separately, but agglomerate into bundles between the tubes as a result of a van-der-Waals interaction, no separation of the species would occur because a single bundle as a rule is formed from metallic carbon nanotubes as well as semi-conducting carbon nanotubes. Statistically, the overwhelming number of bundles therefore contains at least one metallic carbon nanotube, so that nearly all bundles on the whole would behave like a metallic carbon nanotube. A method for separating the carbon nanotubes is disclosed in Bachilo S. M. et al, *Science*, Volume 298 (2002), page 2361.

For the method according to the invention, on the other hand, it is not important how the carbon nanotubes are produced. Known methods for this are, among others, the laser ablation, the disproportioning of carbon monoxide (HiPCO), the arc discharging methods (arc-discharge) or the chemical vapor deposition (CVD).

For the method according to the invention, it is critical that the dielectric constant of liquid $\epsilon_L$, fulfils the following requirement:

$$\epsilon_M > \epsilon_L > \epsilon_H, \qquad (1)$$

wherein $\epsilon_M$ is the dielectric constant of the metallic carbon nanotube and $\epsilon_H$ is the dielectric constant of the semi-conducting carbon nano tube. It is possible to deduce from theoretical reflections that the value of the dielectric constant for the metallic carbon nanotubes is $\epsilon_M > 1000$, meaning it is very high, while the dielectric constant for the semi-conducting carbon nanotubes assumes a low value of $\epsilon_H \approx 10$. The use of polar liquids and in particular a watery solution with a dielectric constant $\epsilon_L = 81$ is consequently preferred as a starting point for the method according to the invention.

An arrangement for generating non-homogeneous electric alternating fields is furthermore needed to realize the method according to the invention. Arrangements of this type are known to some extent from the dielectrophoresis. For example, U.S. Patent Application Publication No. 2003/0048619 A1 discloses an arrangement and a method for producing electrically-conducting micro-wires, in particular made of nanoscale gold particles ranging in size from 15 nm to 30 nm, which are formed between a spaced-apart electrode pair with a gap of several micrometers to a few centimeters by applying an alternating field of 50V to 250V with a frequency of 50 Hz to 1 kHz.

According to the present invention, the suspension containing both species of carbon nanotubes is subjected to a non-homogeneous electrical alternating field. Alternatively, the suspension is introduced into an alternating field of this type. In the non-homogeneous electrical alternating field, a carbon nanotube is subjected to dielectrophoretic forces $F(\omega)$ as follows:

$$F(\omega) \propto \mathrm{Re}[\varepsilon_T(\omega)] \mathrm{Re}\left[\frac{\varepsilon_T(\omega) - \varepsilon_l(\omega)}{\varepsilon_T(\omega) - \varepsilon_l(\omega)}\right] \nabla E_{\mathrm{rms}}^2, \qquad (2)$$

wherein $\epsilon_T$ is the dielectric constant of the carbon nanotube under consideration, $\epsilon_L$ is the dielectric constant of the liquid, $\epsilon_{rms}$ is the effective value of the electrical field intensity and $\omega$ is the frequency of the electrical alternating field.

As long as the suspension is subject to a non-homogeneous electrical alternating field, the metallic carbon nanotubes will move according to equation (2), with $\epsilon_T=\epsilon_M$, in the direction of the field gradient, meaning they experience forces with positive mathematical signs which take them to areas of higher field intensity. Accordingly, semi-conducting carbon nanotubes are subjected to forces, where $\epsilon_T=\epsilon_H$, with negative mathematical sign and, in contrast to the metallic species, are pushed in the opposite direction and out of the electrical alternating field.

In this way, metallic carbon nanotubes and semi-conducting carbon nanotubes can be separated spatially and can subsequently be separated in different ways. For example, a substrate on which the metallic carbon nanotubes have been deposited can be washed off with the ultrasound effect.

Following the deposit of all metallic carbon nanotubes on a substrate which is subsequently removed from the suspension, it is possible according to a special embodiment and an additional step to separate additional components from the semi-conducting carbon nanotubes as suspension in a second liquid with a dielectric constant $\epsilon_L^1<\epsilon_H$. Since the dielectric constant of the semi-conducting carbon nanotubes has a low value of $\epsilon_H\approx 10$, non-polar substances with a low dielectric constant are suitable as a second liquid, e.g. toluene ($\epsilon=5$), cyclohexane ($\epsilon=2.0$), benzene ($\epsilon=2.3$), or carbon tetrachloride ($\epsilon=2.2$).

The frequency level of the applied electrical alternating field must exceed a minimum value, derived from the consideration that carbon nanotubes frequently carry an inherent static electrical charge, that is to say independent of whether they belong to the metallic or semi-conducting species. As a result of this charge, the electrophoretic forces in the constant field dominate the movement of the carbon nanotubes. To avoid this effect, which is undesirable for separating the species, electric alternating fields with sufficiently high frequencies, meaning higher than 10 kHz, must therefore be used.

The non-homogeneous electric alternating field applied to the suspension has a peak-to-peak field intensity that is selected from the range between $10^3$ V/m and $10^9$ V/m, preferably $10^4$ V/m to $10^6$ V/m and especially preferred $10^5$ V/m. With field intensities above $10^9$ V/m, marked changes in the band structure of the carbon nanotubes occur, whereas with field intensities below $10^3$ V/m, the separating effect of the alternating field is too low.

The time scale for separating the two species is in the minute range. However, the separation can also last several hours, depending on the desired degree of separation. Following a time period that is sufficient for the separation, the alternating voltage remains connected or is turned off and the liquid (suspension) containing the semi-conducting species in the above-described, preferred embodiment is removed. The metallic carbon nanotubes, on the other hand, which adhere to the surfaces of the electrodes can be removed, for example with the aid of ultrasound, to a second liquid as suspension.

Raman scattering provides proof that the method according to the invention in reality effectively separates the two species of carbon nanotubes. Carbon nanotubes show resonant Raman scattering when admitted with electromagnetic radiation having a wavelength for which the energy corresponds to the excitations between electronic bands with high density of state, the so-called van Hove Singularities. See for example Dresselhaus M. S. and Eklund P. C., *Advances in Physics*, Volume 6 (2000), pages 705–814.

Viewed geometrically, different vibration modes of the single-wall carbon nanotubes are excited in that case. In the process, the frequency of the radial breathing mode (in short called rbm) represents a direct measure for the diameter of the excited carbon nanotube.

If the diameter of the carbon nanotube is known, it can be shown which of the two species is Raman active (see Ding et al. *Phys. Rev. B*, Volume 66 (2002), page 73401) in the respective wavelength range by taking into consideration the excitation energy with the aid of ribbon-structure calculations for the metallic and/or semi-conducting carbon nanotubes. The breathing modes of metallic and semi-conducting carbon nanotubes below the selected conditions (tube material, excitation wavelength) are far enough apart so that theoretical deficiencies do not change the data interpretation.

According to a further aspect of the invention, there is provided a method of separating metallic carbon nanotubes from semi-conducting carbon nanotubes comprising utilizing a cell which is suitable for realizing a dielectrophoresis, wherein the cell comprises at least two electrodes as well as a liquid suitable as a dielectric and which meets the requirements of equation 1.

An arrangement according to the invention for separating metallic carbon nanotubes and semi-conducting carbon nanotubes, using a non-homogeneous electrical alternating field, comprises electrode pairs that are separated from each other by a gap. Suitable for this is a semi-conducting substrate, preferable consisting of silicon and preferably boron-doped, onto which an insulating layer preferably made of silicon dioxide is deposited. Electrodes, preferably made of gold, are then deposited on the silicon dioxide layer by means of electron-beam lithography and subsequent metallizing, and an alternating voltage is applied to the electrodes. As a result of the field distribution in this arrangement, the metallic species drifts in the direction of the electrodes and adheres to it—orientation of the induced dipole moments in the metallic particles along the field lines—parallel and side-by-side as well as at a right angle to the surface of the electrodes. The semi-conducting carbon nanotubes, on the other hand, remain in liquid suspension.

The separation of metallic carbon nanotubes and semi-conductor carbon nanotubes is a precondition for a purposeful generation of nano electronic structures, such as molecular wires and/or field effect transistors.

BRIEF DESCRIPTION OF THE DRAWINGS

In the following, the invention is explained in further detail with an exemplary embodiment and with the aid of Figures.

DETAILED DESCRIPTION OF THE INVENTION

In a first step, a suspension of separated carbon nanotubes is provided. Used as starting material are carbon nanotubes produced with the so-called HiPco method as described in, for example, P. Nikolaev, *Chem. Phys. Lett.*, Volume 313 (1999), page 91. For this, 50 mg HiPco pipe soot is placed into a solution of 100 ml $D_2O$ with 1% sodium lauryl sulphate (SLS), a surfactant, and is subjected to an ultrasound treatment for 10 minutes with an ultrasound finger having a diameter of 13 mm and a capacity of 200 W. Subsequently, this suspension is centrifuged at 180000 g for 4 hours. Finally, the supernatant is carefully decanted from the solid material.

Figure 1:
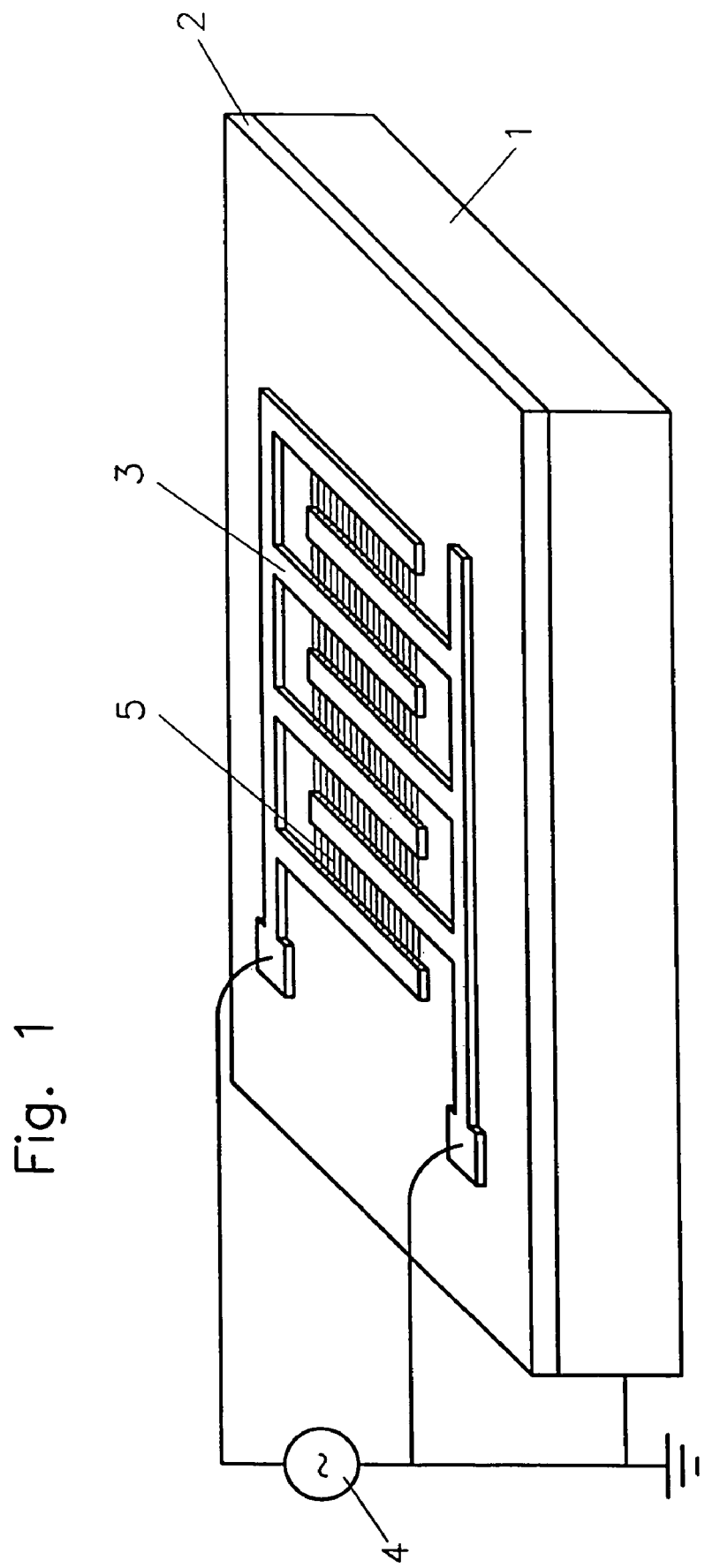
FIG. 1 is a schematic representation of an arrangement for separating metallic carbon nanotubes from semi-conducting carbon nanotubes in an alternating field with the aid of dielectrophoresis.

FIG. 1 shows an exemplary embodiment of an arrangement for separating metallic carbon nanotubes from semi-conducting carbon nanotubes according to the invention. Metallic electrodes 3 for generating non-homogeneous electric alternating fields are produced on a substrate 1, 2 and are connected connected via terminals to a an alternating voltage source 4. As shown in FIG. 1, a boron-doped silicon with a specific electric resistance of $p > 1\Omega \cdot cm$ is used as substrate 1, onto which is deposited a 600 nm thick, thermally oxidized insulating layer 2 of silicon dioxide ($SiO_2$), thus resulting in a total thickness of 525 µm. The lateral dimensions of the probe are 8 mm×4 mm.

An electrode structure is written into a resist of polymethyl methacrylate (PMMA) by means of standard electron-beam lithography and is subsequently developed. The metallizing of the electrode structure according to FIG. 1 takes place in a high-vacuum atomizer. For this, a 2 nm thick layer of titanium as adhesion promoter and subsequently a 30 nm thick layer of gold are deposited on the prepared electrode structure with the sputtering technique. The contacts of the electrodes 3 are connected to a function generator which may serve as alternating voltage source 4.

To separate the metallic carbon nanotubes from the semi-conducting carbon nanotubes, 2 ml of the suspension containing individual carbon nanotubes are initially dripped onto electrodes 3. The function generator 4, which is operated with a starting frequency of 10 MHz and an alternating voltage with peak-to-peak amplitude $V_{p-p}=10$ V is initially turned on for 10 minutes for the alternating field dielectrophoresis. Following the shutting down of the alternating field, the suspension around the electrodes 3 is removed with a pipette and the surface blown dry with the aid of nitrogen. Metallic carbon nanotubes 5 are deposited on the surface between the metallic electrodes, and are removed with an ultrasound treatment in a new suspension consisting of $D_2O$ with 1% sodium lauryl sulphate (SLS) The new suspension contains metallic carbon nanotubes 5 and is practically free of the semi-conducting species.

Figure 2:
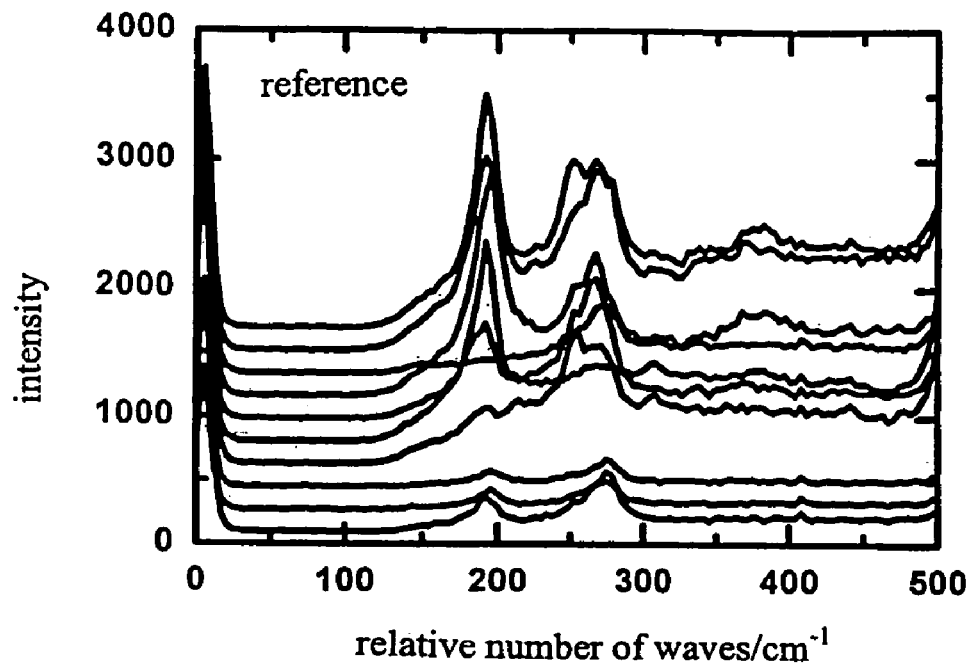
FIG. 2 is a graph showing Raman spectra at different points of a reference probe.

FIG. 2 shows Raman spectra recorded at different points on a reference probe. The different spectra with their intensity are applied in random units as compared to the wave number in $cm^{-1}$, relative to the wavelength for the excitation wave. The reference probe is produced by dripping the original suspension consisting of separated carbon nanotubes onto a silicon substrate. Two lines dominate the spectra, one of which is in the spectral region below 200 $cm^{-1}$ and one is around 275 $cm^{-1}$.

Figure 3:
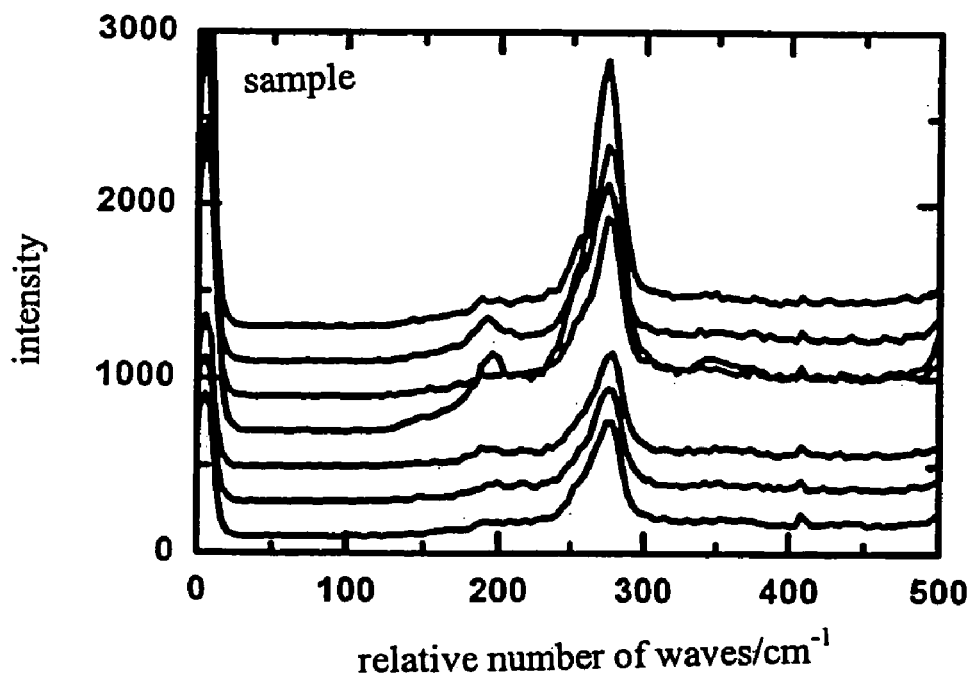
FIG. 3 is a graph showing Raman spectra at different points between the metallic electrodes.

FIG. 3 shows Raman spectra recorded at different points between metallic electrodes. The spectra are deposited in the same way as in FIG. 2. A line around 275 $cm^{-1}$ in this case dominates the spectra.

Figure 4:
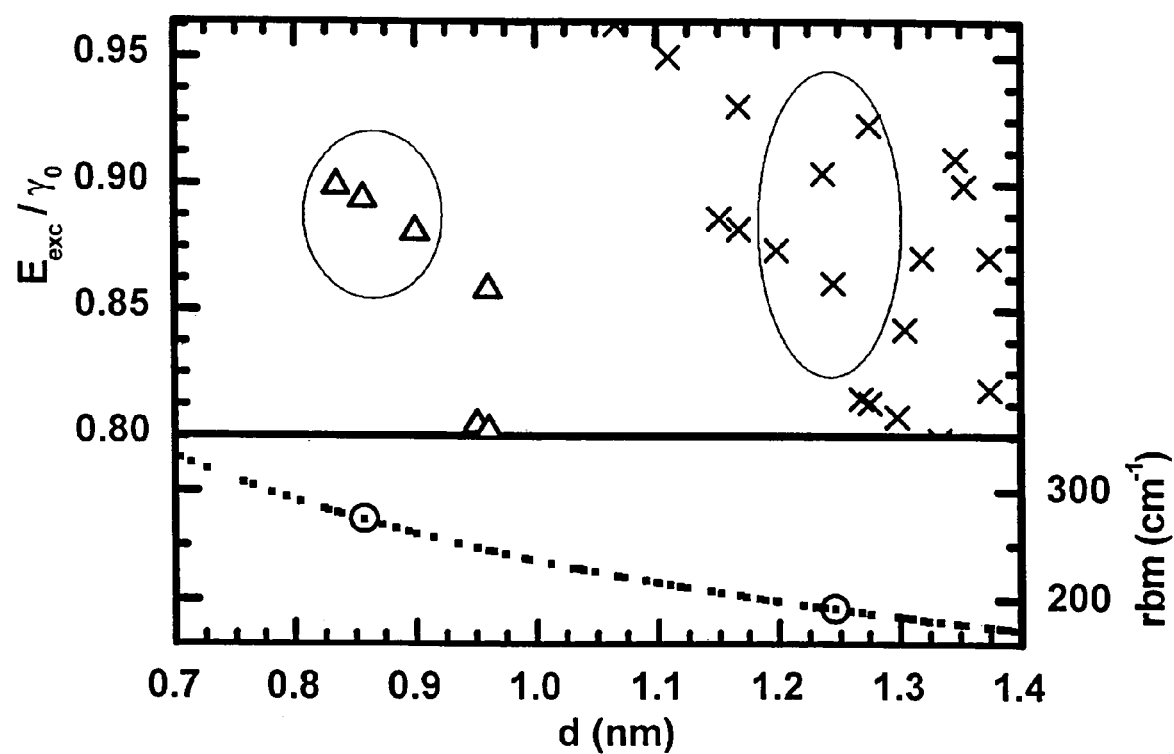
FIG. 4 is a graph showing a correlation between possible excitation energies and a breathing mode frequency in relation to the diameter of the carbon nanotubes.

FIG. 4 is used for interpreting the data and contrasts the computed excitation energies and the measures lines, which can be interpreted as breathing modes for different tube diameters. Owing to theoretical uncertainties in $\gamma_o$, meaning the overlap integral with tight-binding calculations, carbon nanotubes having the diameters as shown must be considered for the observed Raman scattering for the excitation wavelength $\lambda=514$ that is used. The clearly different frequencies of the breathing modes (radial breathing modes, in short rbm), however, permit the clear statement that metallic tubes are responsible for breathing frequencies at 274 $cm^{-1}$ and that breathing frequencies close to 192 $cm^{-1}$ stem from semi-conducting tubes.

From this statement we can draw the conclusion that the metallic species of the carbon nanotubes is present almost exclusively between the metallic electrodes, as can be seen from a comparison of the Raman spectra shown in FIGS. 2 and 3.

The invention has been described in detail with respect to exemplary embodiments, and it will now be apparent from the foregoing to those skilled in the art, that changes and modifications may be made without departing from the invention in its broader aspects, and the invention, therefore, as defined in the appended claims, is intended to cover all such changes and modifications that fall within the true spirit of the invention.

What is claimed is:

1. A method for separating metallic carbon nanotubes and semi-conducting carbon nanotubes, comprising:
   providing a suspension containing a plurality of individual metallic carbon nanotubes and semi-conducting carbon nanotubes in a liquid, for which the dielectric constant $\epsilon_L$ meets the requirement:

$\epsilon_M > \epsilon_L > \epsilon_H$, wherein $\epsilon_M$ is the dielectric constant of the metallic carbon nanotubes and $\epsilon_H$ is the dielectric constant of the semi-conducting carbon nanotubes;
   applying a non-homogeneous electric alternating field to the suspension to create spatially separate species of the metallic carbon nanotubes and the semi-conducting carbon nanotubes; and
   removing at least one of the separate species.

2. The method according to claim 1, wherein the providing step includes forming a suspension in water of the carbon nanotubes.

3. The method according to claim 2, including adding a surfactant to the suspension as a separating mechanism.

4. The method according to claim 1, wherein the applying step includes using an alternating field having a peak-to-peak field intensity selected from a range between about $10^3$ V/m and about $10^9$ V/m.

5. The method according to claim 4, wherein the range is about $10^4$ V/m to about $10^6$ V/m.

6. The method according to claim 4, wherein the peak-to-to field intensity is about $10^5$ V/m.

7. The method according to claim 1, wherein the applying step includes using an alternating field having a frequency from a range between about 10 kHz and about 100 GHz.

8. The method according to claim 7, wherein the range is about 1 MHz to about 100 MHz.

9. The method according to claim 7, wherein the frequency is about 10 MHz.

* * * * *